(12) United States Patent
Marukawa et al.

(10) Patent No.: US 7,125,628 B2
(45) Date of Patent: Oct. 24, 2006

(54) BATTERY PACK WITH PRESSURIZED TERMINAL PLATES

(75) Inventors: Shuhei Marukawa, Toyohashi (JP); Ko Watanabe, Toyohashi (JP); Toyohiko Etoh, Toyota (JP); Keiji Shukuya, Nagoya (JP); Shogo Yoneda, Toyota (JP)

(73) Assignees: Matsushita Electric Industrial Co., Ltd., Osaka (JP); Toyota Jidosha Kabushiki Kaisha, Aichi (JP)

( * ) Notice: Subject to any disclaimer, the term of this patent is extended or adjusted under 35 U.S.C. 154(b) by 0 days.

(21) Appl. No.: 10/196,903

(22) Filed: Jul. 16, 2002

(65) Prior Publication Data

US 2003/0017387 A1 Jan. 23, 2003

(30) Foreign Application Priority Data

Jul. 23, 2001 (JP) ............................. 2001-222155

(51) Int. Cl.
*H01M 6/42* (2006.01)
(52) U.S. Cl. ...................... 429/149; 429/158; 429/157; 429/123
(58) Field of Classification Search ................. 429/99, 429/97, 96, 157, 158, 159, 100, 156, 178, 429/66, 186, 7; 206/703, 722
See application file for complete search history.

(56) References Cited

U.S. PATENT DOCUMENTS

| | | | | |
|---|---|---|---|---|
| 4,020,244 A | * | 4/1977 | Selinko | 429/100 |
| 4,109,064 A | * | 8/1978 | Warner et al. | 429/66 |
| 5,346,786 A | * | 9/1994 | Hodgetts | 429/159 |
| 5,364,713 A | * | 11/1994 | Von Benda et al. | 429/66 |
| 5,618,641 A | * | 4/1997 | Arias | 429/210 |
| 5,800,942 A | * | 9/1998 | Hamada et al. | 429/148 |
| 5,879,831 A | | 3/1999 | Ovshinsky et al. | |
| 6,372,377 B1 | | 4/2002 | Ovshinsky et al. | |
| 6,517,966 B1 | * | 2/2003 | Marukawa et al. | 429/120 |

FOREIGN PATENT DOCUMENTS

| | | |
|---|---|---|
| DE | 50854 | 2/1890 |
| JP | A6-338340 | 12/1994 |
| JP | 2001-236937 | * 8/2001 |

* cited by examiner

*Primary Examiner*—Raymond Alejandro
(74) *Attorney, Agent, or Firm*—Snell & Wilmer L.L.P.

(57) ABSTRACT

A battery pack comprises a plurality of rectangular shaped batteries, wherein each of the plurality of rectangular shaped batteries is formed into a thin rectangular-parallelepiped shape, and wherein the plurality of rectangular shaped batteries are stacked side-by-side in a thickness direction, and a pair of pressurizing plates, wherein one of the pressurizing plates is located at each end of the stacked rectangular shaped batteries oriented in the thickness direction, wherein the pressurizing plates are elastically pushed against each other to pressurize the plurality rectangular shaped batteries.

5 Claims, 8 Drawing Sheets

BATTERY PACK WITH PRESSURIZED TERMINAL PLATES

BACKGROUND OF THE INVENTION

1. Field of the Invention

The present invention relates to a battery pack to be mounted to an electric vehicle or the like. Specifically, the present invention relates to a battery pack comprising a plurality of rectangular shaped batteries formed into a thin rectangular-parallelepiped shape which are stacked side-by-side in a thickness direction to be integrated into a battery pack.

2. Description of the Related Art

A secondary battery which can be repeatedly charged and discharged is used as a power source of a motor in various types of electric vehicles, for example, a hybrid electric vehicle, or the like. A secondary battery, when used in an electric vehicle, is required to have a large capacity of charge and a high voltage. Therefore, a plurality of thin rectangular-parallelepiped shaped batteries, each comprising a plurality of battery cells, are stacked side-by-side and integrated to form a battery pack. The battery pack is mounted in a vehicle.

FIG. 8 is a perspective view of an example of a battery pack 800 to be mounted in an electric vehicle. The battery pack 800 shown in FIG. 8 comprises a plurality of rectangular shaped batteries 801, each having a thin rectangular-parallelepiped shape. The rectangular shaped batteries 801 are stacked side-by-side in the thickness direction. All the rectangular shaped batteries 801 stacked side-by-side are fixed to a lower case 863 with each being pressurized toward the thickness direction by a pair of pressurizing plates 830 located on both ends of the stacked rectangular shaped batteries 801 in the thickness direction.

Each of the rectangular shaped batteries 801 comprises Nickel-metal hydride secondary batteries having similar structures and a thin rectangular-parallelepiped shape battery case. An inner space of the battery case is divided into, for example, six battery cells located in parallel in the width direction, which is orthogonal to the thickness direction and a height direction, by five walls extending in the thickness direction. Each of the battery cells contains a plurality of positive plates and a plurality of negative plates. In the battery cells, the positive plates and the negative plates are provided with separators interposed therebetween.

All the positive plates in the battery cell are connected to a collector plate. All the negative plates in the battery cell are also connected to a collector plate. In the battery cell, the collector plates oppose each other with all the positive plates and the negative plates interposed therebetween. The collector plates extend along side surfaces of the battery cases. The collector plate of the positive pole located in one battery cell is connected to the collector plate of the negative pole located in the adjacent battery cell. In the battery cells located on both ends of the battery case in the width directions, the positive collector plates and the negative collector plates extending along the side surfaces of the battery case are respectively connected to positive and negative posts 818 which are respectively provided on the side surfaces of the battery case with washers 809.

The rectangular shaped batteries 801 are positioned so that the positive posts 818 of rectangular shaped batteries 801 and the negative posts 818 of the adjacent rectangular shaped batteries 801 are aligned alternatively in the thickness direction. Furthermore, all rectangular shaped batteries 801 are connected in series so that the positive post 818 and the negative post 818 adjacent each other are electrically and mechanically connected to each other by a bus bar 861. The bus bars 861 are fixed by nuts 862 which are screwed to the positive and negative posts 818.

The pair of pressurizing plates 830 for pressurizing all the stacked rectangular shaped batteries 801 are connected to each other by an upper pair of tie rods 850 and a lower pair of tie rods 850 with all the rectangular shaped batteries 801 being pressurized. Each end of the tie rods 850 is fixed to the respective pressurizing plates 830.

The lower case 863 has a bottom surface 863a which supports the rectangular shaped batteries 801 and the pair of the pressurizing plates 830, and a side surface 863b extending upwards from one end of the bottom surface 863a. Each of the rectangular shaped battery 801 is respectively fixed to the bottom surface 863a of the lower case 863 by a pair of bolts 864.

In a battery case 800 having the above-described structure, upper portions of the pair of the pressurizing plates 830 are connected to each other by a pair of the tie rods 850. Similarly, lower portions of the pair of the pressurizing plates 830 are connected to each other by a pair of the tie rods 850. By adjusting the tie rods 850 so that the pressurizing plates 830 locate close to each other, all the stacked rectangular shaped batteries 801 are maintained under pressure. The rectangular shaped batteries 801 in such a state are fixed to the bottom surface 863a of the lower case 863 by the pair of the bolts 864 and form the battery pack 800. The battery pack 800 formed as described above is mounted to be used in an electric vehicle, or the like.

While the rectangular shaped batteries 801 of the battery pack 800 is used, the temperature inside the rectangular shaped batteries 801 rises and hydrogen gas is generated due to an electrochemical reaction which occurs in the battery cells. Thus, the battery cases, which are made of a synthetic resin, expand. Creep deformation of the battery cases of the rectangular shaped batteries 801 occurs when they are maintained pressurized for a long time under a high temperature by the pair of the pressurizing plates 830 connected to each other by the upper pair and the lower pair of tie rods 850. After use of the rectangular shaped batteries 801, the battery cases of the rectangular shaped batteries 801 which suffer the creep deformation are left in a low temperature atmosphere. Thus, the rectangular shaped batteries 801 which suffer the creep deformation shrink and a gap may be generated between the rectangular shaped batteries 801 adjacent each other.

Since the above-described battery cases of the rectangular shaped batteries 801 are fixed to the bottom surface 863a of the lower case 863 by the pair of the bolts 864, and the posts 818 of the rectangular shaped batteries 801 adjacent each other are connected by the bus bar 861, there is no possibility that all of the rectangular shaped batteries 801 are disconnected from each other. However, such a structure in which all the battery cases of the rectangular shaped batteries 801 are fixed to the bottom surface 863a of the lower case 863 by the pair of the bolts 864 requires screwing a number of threaded bolts 864. Thus, there is a problem that the bolting cannot be readily performed.

If a gap is generated between the rectangular shaped batteries 801 adjacent each other, loads imposed by the tie rods 850 are not applied to the battery cases of the rectangular shaped batteries 801 any more. As a result, expansion of the battery cases of the rectangular shaped batteries 801 cannot be prevented thereafter.

SUMMARY OF THE INVENTION

According to one aspect of the present invention, there is provided a battery pack comprising: a plurality of rectangular shaped batteries, wherein each of the plurality of rectangular shaped batteries is formed into a thin rectangular-parallelepiped shape, and wherein the plurality of rectangular shaped batteries are stacked side-by-side in a thickness direction; and a pair of pressurizing plates, wherein one of the pressurizing plates is located at each end of the stacked rectangular shaped batteries oriented in the thickness direction, wherein the pressurizing plates are elastically pushed against each other to pressurize the plurality rectangular shaped batteries.

In one embodiment of the present invention, one of the pair of the pressurizing plates is connected to an end plate located beyond the other pressurizing plate with respect to the stacked rectangular shaped batteries, the other pressurizing plate proximate to the end plate being pushed away from the end plate by elastic members.

In one embodiment of the present invention, a positive terminal plate and a negative terminal plate are provided on respective side surfaces of the rectangular shaped batteries along a width direction of the stacked rectangular shaped batteries, which is orthogonal to the thickness direction, the positive terminal plate being in contact with a negative terminal plate of one adjacent rectangular shaped battery and the negative terminal plate being in contact with a positive terminal plate of the other adjacent rectangular shaped battery.

In one embodiment of the present invention, the positive terminal plate and the negative terminal plate provided in each of the rectangular shaped batteries are pushed so that the positive terminal plate and the negative terminal plate are held to the negative terminal plate and the positive terminal plate of the adjacent rectangular shaped batteries by pressure.

In one embodiment of the present invention, the terminal plates are formed of clad plates in which plates having a high elasticity and plates having a high conductivity are layered.

According to another aspect of the present invention, there is provided a battery pack comprising: a plurality of rectangular shaped batteries, wherein each of the plurality of rectangular shaped batteries is formed into a thin rectangular-parallelepiped shape, and wherein the plurality of rectangular shaped batteries are stacked side-by-side in a thickness direction; and a pair of pressurizing plates, wherein one of the pressurizing plates is located at each end of the stacked rectangular shaped batteries oriented in the thickness direction, and wherein the pressurizing plates pressurize the plurality of rectangular shaped batteries, wherein at least a pair of the rectangular shaped batteries stacked adjacent each other are engaged to each other such that movement in a height direction of the stacked rectangular shaped batteries which is orthogonal to the thickness direction is suppressed.

In one embodiment of the present invention, every other or every few of the stacked rectangular shaped batteries of the rectangular shaped batteries stacked side-by-side in the thickness direction is or are fixed to a case.

In one embodiment of the present invention, each of the rectangular shaped batteries is engaged with the adjacent rectangular shaped battery so as to be movable in the width direction which is orthogonal to the thickness direction.

Thus, the invention described herein makes possible the advantages of (1) providing a battery pack in which battery cases stacked side-by-side can be readily assembled, and (2) providing a battery pack in which expansion of the battery cases of the rectangular shaped batteries can be prevented and which is capable of being used for a long time in a stable manner.

These and other advantages of the present invention will become apparent to those skilled in the art upon reading and understanding the following detailed description with reference to the accompanying figures.

DESCRIPTION OF THE PREFERRED EMBODIMENTS

Hereinafter, examples of the present invention are described with reference to the drawings.

Figure 1:
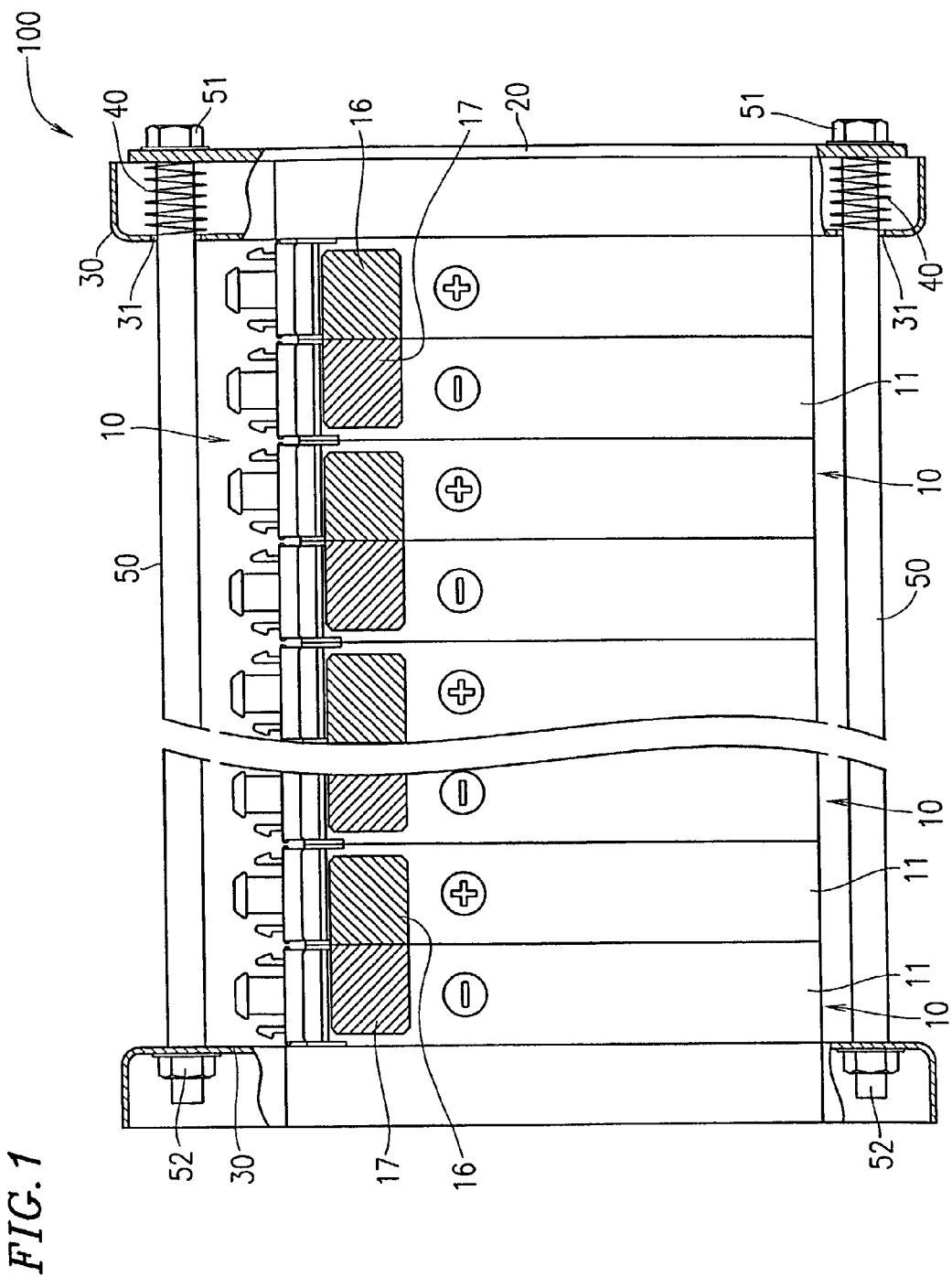
FIG. 1 is a front view of a battery pack according to an example of the present invention.

FIG. 1 is a front view of a battery pack 100 according to an example of the present invention. As shown in FIG. 1, the battery pack 100 has a plurality of rectangular shaped batteries 10 each having a thin rectangular-parallelepiped shape. The rectangular shaped batteries 10 are stacked side-by-side in a thickness direction. The rectangular shaped batteries 10 are pressurized by pressurizing plates 30 located on both ends of the rectangular shaped batteries 10 in the thickness direction. The pressurizing plates 30 are respectively held to these rectangular shaped batteries 10 by pressure. All the rectangular shaped batteries 10 are interposed between the pressurizing plates 30. Two adjacent rectangular shaped batteries 10 form a pair. As such, a plurality of the pairs of the rectangular shaped batteries 10 are positioned between the pressurizing plates 30.

Figure 2:
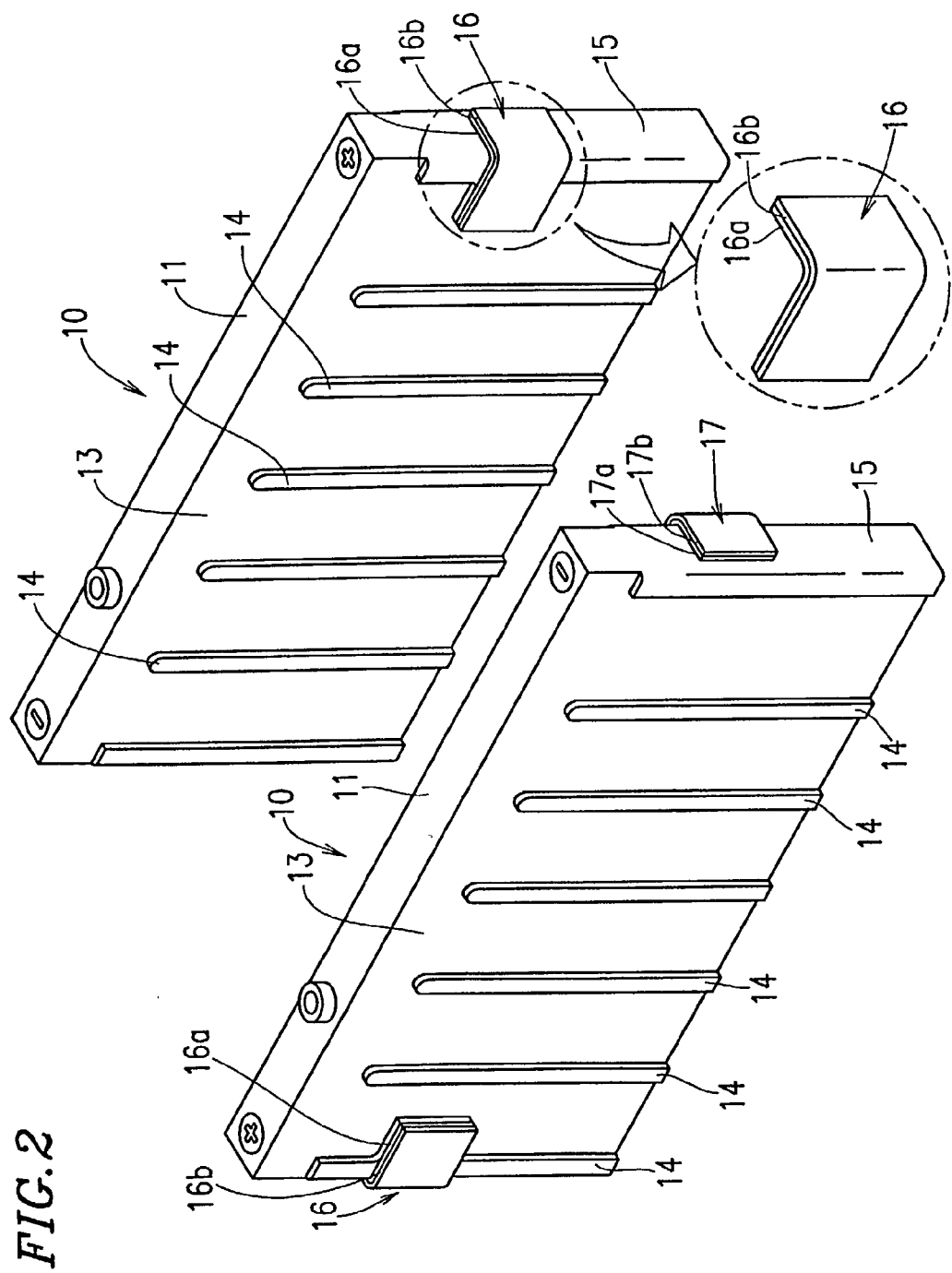
FIG. 2 is a perspective view of rectangular shaped batteries used in the battery pack shown in FIG. 1.
Figure 3:
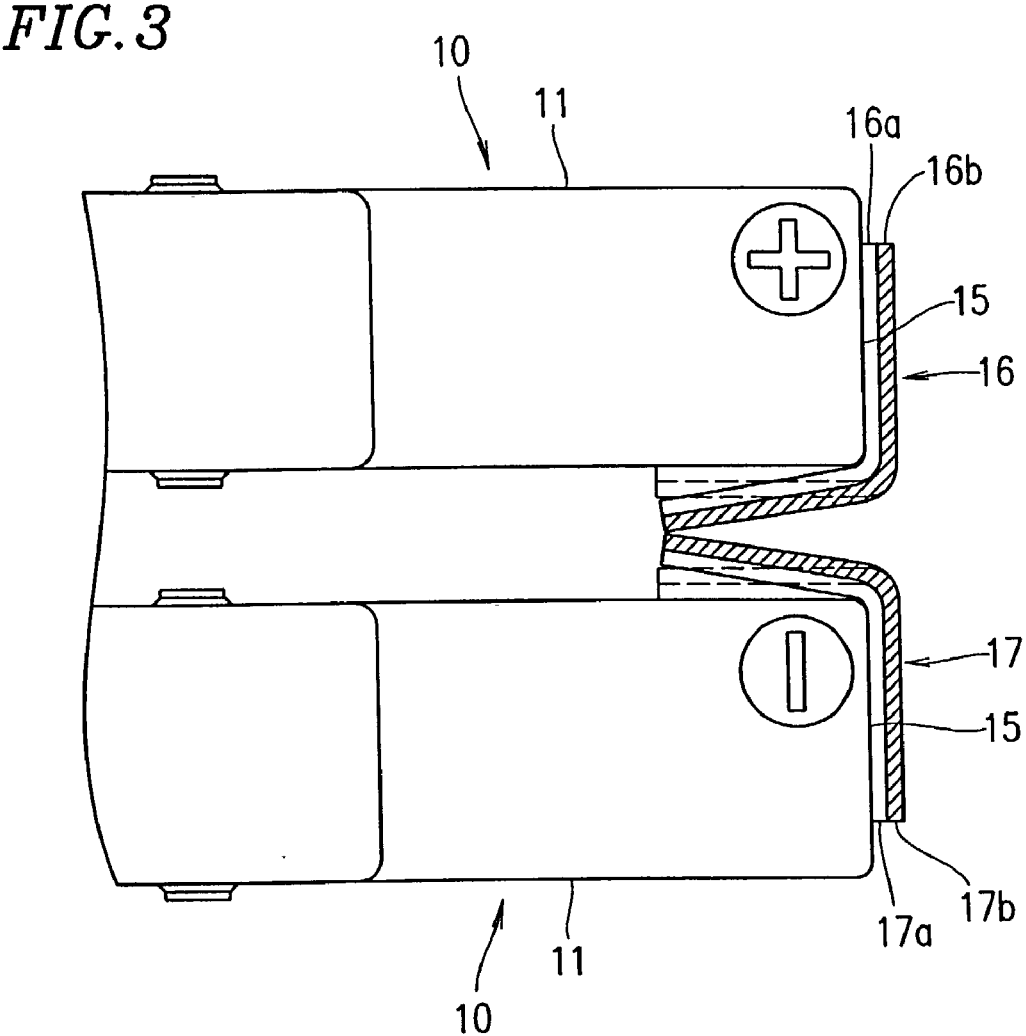
FIG. 3 is a plan view of a portion of the battery pack shown in FIG. 1.

FIG. 2 is an exploded perspective view of a pair of the rectangular shaped batteries 10 held between the pressurizing plates 30. FIG. 3 is a plan view of a portion of the pair of the rectangular shaped batteries 10. Each of the rectangular shaped batteries 10 comprises nickel metal hydride secondary batteries having similar structures and a thin rectangular-parallelepiped shape battery case 11. An inner space of the battery case 11 is divided into, for example, six battery cells located in the width direction, by five walls extending in the thickness direction. Each of the battery cells contains a plurality of positive plates and a plurality of negative plates. In the battery cells, the positive plates and the negative plates are provided with separators interposed therebetween.

All the positive plates in the battery cell are connected to a collector plate. All the negative plates in the battery cell are also connected to a collector plate. In the battery cell, the collector plates oppose each other with all the positive plates and the negative plates located interposed therebetween. The collector plate of the positive pole located in one battery cell is connected to the collector plate of the negative pole located in the adjacent battery cell. In the battery cells located on both ends of the battery case 11 in the width direction, the positive collector plates and the negative collector plates extending along the side surfaces 15 of the battery case 11 are respectively connected to positive terminal plates 16 and negative terminal plates 17 which have a shape conforming to respective corners of each of the side surfaces 15 of the battery cases 11.

The positive terminal plates 16 and negative terminal plates 17 provided in the rectangular shaped batteries 10 are formed of clad plates in which spring steel plates 16*a* and 17*a* which are metal plates having a high elasticity and copper plates 16*b* and 17*b* which are metal plates having a high conductivity are layered. The positive terminal plates 16 and negative terminal plates 17 are bent, with the spring steel plates 16*a* and 17*a* on the inside of the bend, so as to have obtuse angles slightly larger than a right angle.

The positive terminal plate 16 and negative terminal plate 17 provided in one of the pair of the rectangular shaped batteries 10 are respectively connected to the positive collector plate and the negative collector plate provided in the respective battery cells located on both ends of the battery case 11. The positive terminal plate 16 and negative terminal plate 17 extend along the side surface 15 of the battery case 11 and along a surface 13 along a width direction of the battery case 11. In the pair of the rectangular shaped batteries 10, a portion of the positive terminal plate 16, which extends along the surface 13 of the battery case 11, of one rectangular shaped battery 10 and a portion of the negative terminal plate 17, which extends along the surface 13 of the battery case 11, of the other rectangular shaped battery 10 are held to each other by pressure.

As shown in FIG. 3, portions of the positive terminal plate 16 and the negative terminal plate 17 which extend along the surfaces of the battery case 11 are tilted so as to form an obtuse angle with respect to the side surface 15 of the battery case 11. Therefore, the portions of the positive terminal plate 16 and negative terminal plate 17 which are held to each other by pressure are pushed away from the surfaces of the battery cases 11 and pushed against each other with high pressure.

On the surfaces 13 along the width direction of the battery case 11, a plurality of ribs 14 are provided with certain spaces therebetween along the width direction. The plurality of ribs 14 are extending along a height direction on each of the surfaces 13. The ribs 14 are provided along the walls dividing the battery cells provided inside the battery case 11. When the rectangular shaped batteries 10 are stacked side-by-side, the ribs 14 on the battery case 11 of one rectangular shaped battery 10 are in contact with the corresponding ribs 14 on the battery case 11 of the adjacent battery 10. Thus, vents which correspond to the respective battery cells provided in the battery case 11 are formed between the ribs 14 which are in contact with each other.

As shown in FIG. 1, in a top portion of the respective pressurizing plates 30 which are located on both ends of the stacked rectangular shaped batteries 10, a pair of apertures 31 are provided with an appropriate space therebetween along the width direction. In each of the apertures 31, an end of the respective tie rods 50 are inserted. Also, in a bottom portion the respective pressurizing plates 30, a pair of apertures 31 are provided with an appropriate space therebetween along the width direction. An end of the tie rods 50 are respectively inserted into the apertures 31.

A head 51 is provided at one end of the respective tie rods 50 and a nut 52 is screwed onto the tie rods 50 at the other end of the respective tie rods 50. An end plate 20 is provided on an outer surface of one of the pair of pressurizing plates 30. The end of the tie rod 50 adjacent to the head 51 penetrates the end plate 20. The heads 51 of the tie rods 50 are held to the end plate 20 by pressure.

A portion of the respective tie rods 50, between the end plate 20 and one pressurizing plate 30 proximate to the end plate 20, is fitted with a compression spring 40 which serves as an elastic member. The other end of the respective tie rods 50 penetrates the aperture 31 of the other pressurizing plate 30 distal to the end plate 20. The nut 52 is screwed to the other end of the respective tie rods 50. By tightening the nut 52, a distance between the end plate 20 and the pressurizing plate 30 distal to the end plate 20 becomes smaller, and the compression springs 40 which are fitted to the respective tie rods 50 are compressed.

In the battery pack 100 having the above-described structure, the end plate 20 and the pressurizing plate 30 distal to the end plate 20 are connected to each other by an upper pair of the tie rods 50 and a lower pair of the tie rods 50. By the compression springs 40 fitted into the tie rods 50, the pressurizing plate 30 proximate to the end plate 20 is pushed away from the end plate 20. Thus, the pressurizing plate 30 pushed by the compression springs 40 pressurize all the stacked rectangular shaped batteries 10 toward the other pressurizing plate 30.

In such a state, all the rectangular shaped batteries 10 located between the pair of the pressurizing plates 30 are pressurized so that they are held to each other by pressure. Thus, the positive terminal plates 16 and negative terminal plates 17 which are held to each other by pressure between the battery cases 11 of the adjacent rectangular shaped batteries 10 are maintained under high pressure.

The battery pack 100 in which all the rectangular shaped batteries 10 are maintained under high pressure by the pair of the pressurizing plates 30 is mounted to, for example, an electric vehicle, or the like. While the rectangular shaped batteries 10 are used, the temperature inside the rectangular shaped batteries 10 rises and hydrogen gas is generated due to an electrochemical reaction which occurs in the battery cells. Thus, the battery case 11, which is made of a synthetic resin, expands. Creep deformation of the battery cases 11 of the rectangular shaped batteries 10 occurs when the battery cases 11 of the rectangular shaped batteries 10 maintained under pressure by the pair of the pressurizing plates 30 for a long time under a high temperature.

The battery cases of the rectangular shaped batteries 10 which suffer the creep deformation are left under a low temperature atmosphere and thus shrink,. For example, one of the pair of the pressurizing plates 30 is pushed against the other pressurizing plates 30 by the compression springs 40, and all the rectangular shaped batteries 10 are pressurized toward each other. Thus, there is no possibility that a gap is generated between the adjacent rectangular shaped batteries 10 even if the rectangular shaped batteries 10 themselves shrink. Therefore, it is not required to fix the battery cases 11 of the rectangular shaped batteries 10 with bolts as is conventional.

Figure 4:
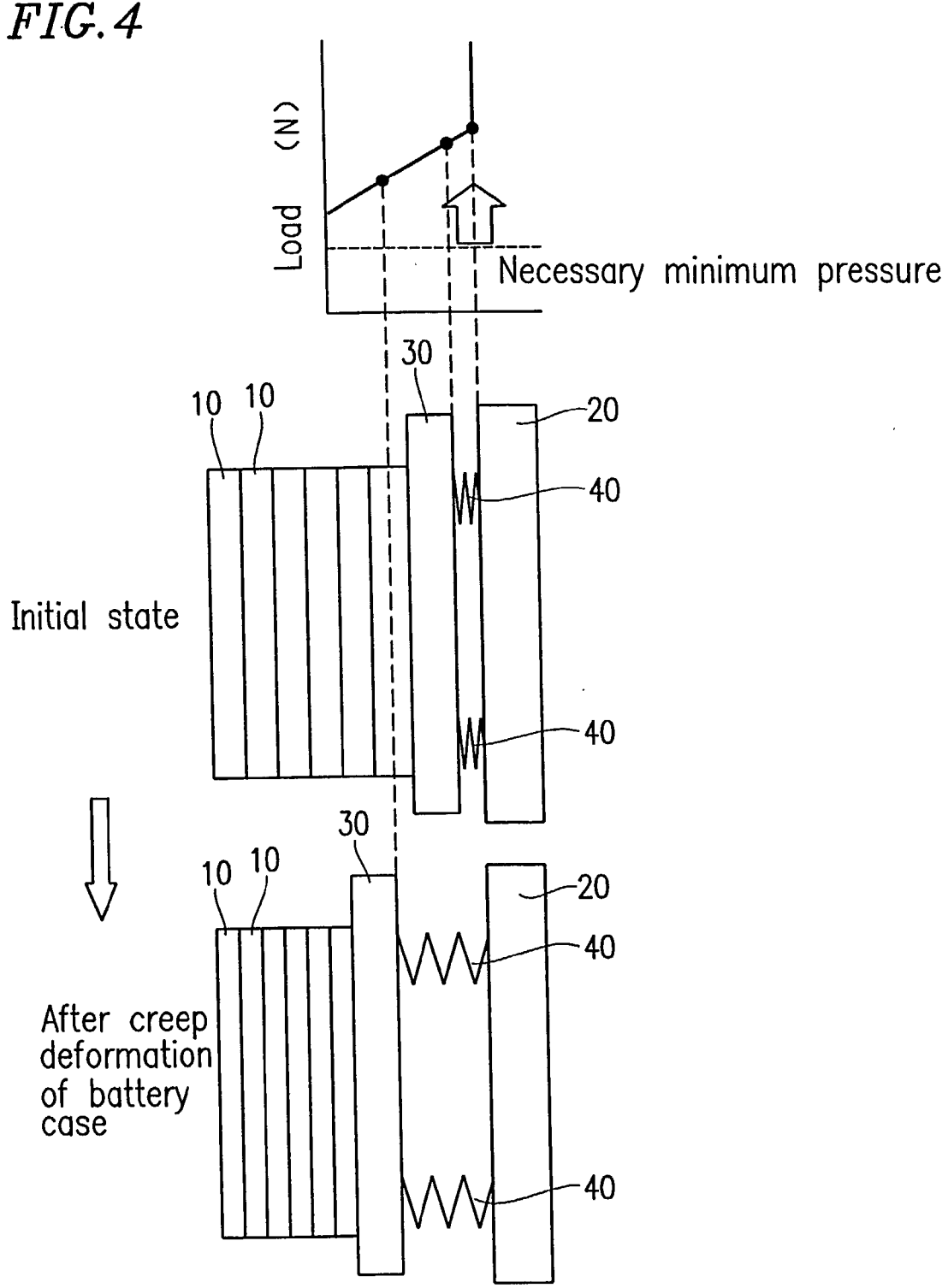
FIG. 4 is a schematic view illustrating the functions of the battery pack shown in FIG. 1.

FIG. 4 is a schematic view of the battery pack 100 in an initial state, and the battery pack 100 after the creep deformation of the battery case 11 of the rectangular shaped battery 10. In the initial state, each of the rectangular shaped batteries 10 in the battery pack 100 are maintained under pressure by a large load imposed by a pushing force of the compression springs 40. After the creep deformation and shrinkage of the battery cases 11 of the rectangular shaped batteries 10, the pressure applied by the pushing force of the compression springs 40 to the battery cases 11 of the rectangular shaped batteries 10 is decreased. However, the pushing force of the compression springs 40 is set so as to apply a necessary minimum pressure to the battery cases 11 of the rectangular shaped batteries 10, even when the battery cases 11 of the rectangular shaped batteries 10 suffer from the creep deformation and shrinkage, so that the battery cases 11 of the rectangular shaped batteries 10 remain pressurized. Thus, the expansion of the battery case 11 is suppressed.

The rectangular shaped batteries 10 adjacent each other are electrically connected by the positive terminal plates 16 and negative terminal plates 17 which are held to each other by pressure. Since the positive terminal plates 16 and negative terminal plates 17 are pushed to be held to each other by pressure, and are also pressurized to each other by the compression springs 40, the pressure applied to the positive terminal plates 16 and negative terminal plates 17 is high and thus electrical connections between the positive terminal plates 16 and negative terminal plates 17 are secured. Therefore, bolting for electrical connection of the rectangular shaped batteries 10 adjacent each other is not necessary.

Figure 5:
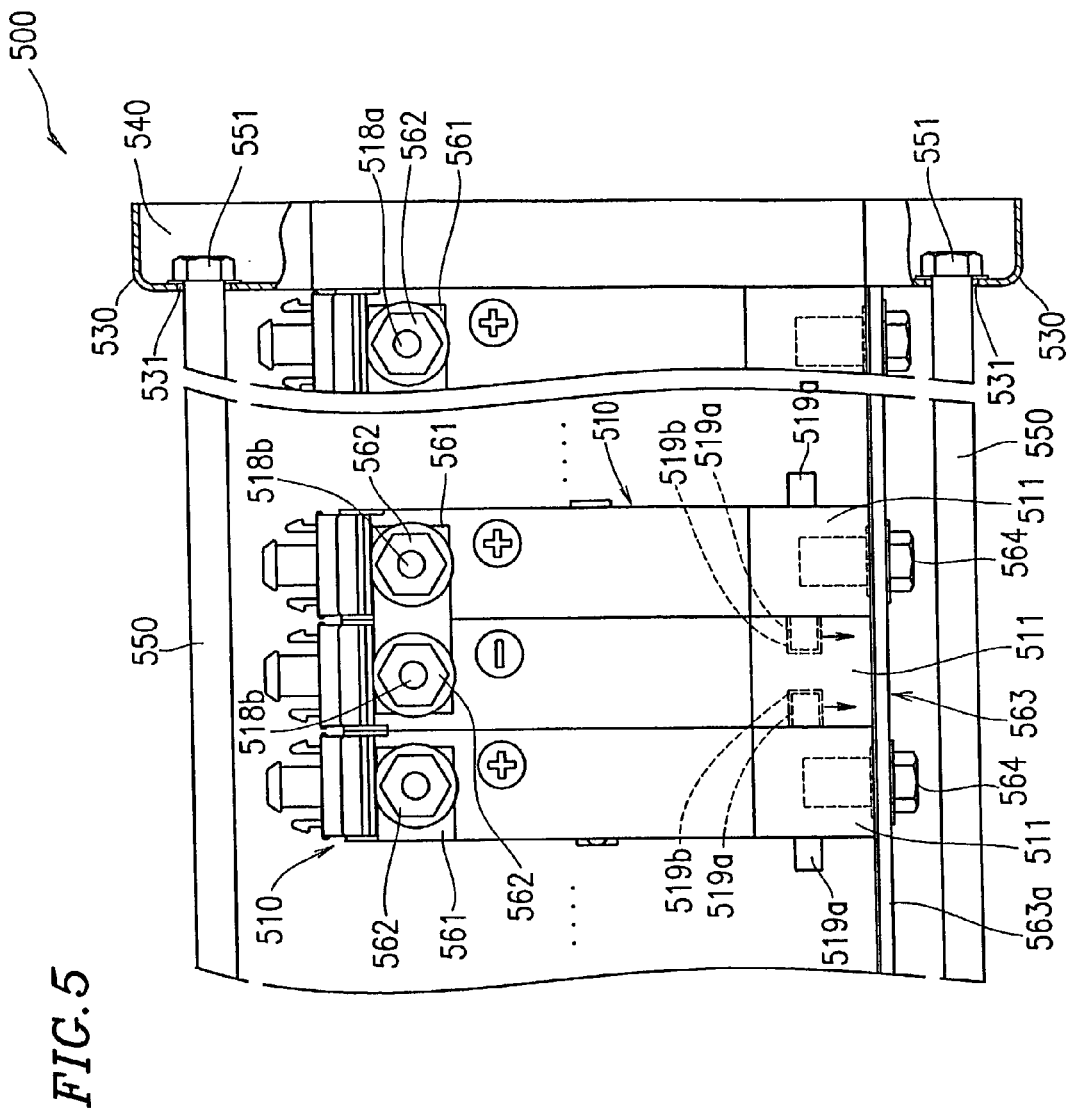
FIG. 5 is a side view of a portion of a battery pack according to another example of the present invention.
Figure 6:
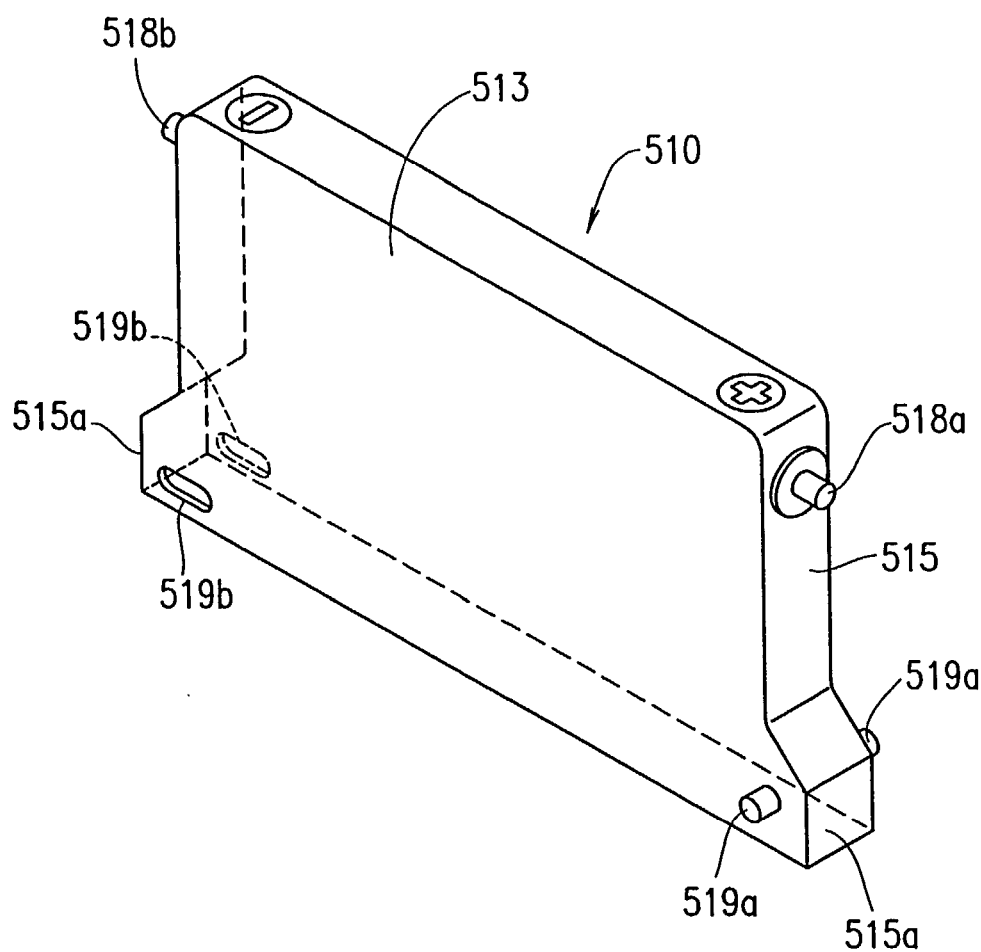
FIG. 6 is a perspective view of a rectangular shaped battery used in the battery pack shown in FIG. 5.

FIG. 5 is a partial cross sectional view of a battery pack 500 according to another example of the present invention. FIG. 6 is a perspective view of a rectangular shaped battery 510 used in the battery pack 500. The rectangular shaped battery 510 used in the battery pack 500 has a battery case 511 formed of a synthetic resin, which has a thin rectangular-parallelepiped shape. The inner structure of the battery case 511 is similar to that of the battery case 11 of the rectangular shaped battery 10 used in the battery pack 100 shown in FIG. 1.

As shown in FIG. 6, on the upper portions of side surfaces 515 of the battery cases 511 formed of a synthetic resin, positive posts 518a and negative posts 518b are provided so as to protrude from the respective side surfaces 515. From the lower portion of the respective side surfaces 515 of the battery case 511, leg portions 515a protrude outward.

In the battery case 511, engaging pins 519a are provided to the leg portion 515a of the lower portion of the side surface 515 to which the positive post 518a is provided. The engaging pins 519a protrude from the surfaces along the width direction of the battery case 511 and in the thickness direction of the battery case 511. Meanwhile, engaging recesses 519b are provided inside surface 513 and to the leg portion 515a of the lower portion of the side surface 515 to which the negative post 518b is provided. The engaging recesses 519b to which the engaging pins 519a are to be inserted are provided on the surface of the battery case 511 along the width direction. The engaging recesses 519b are slots extending along the width direction of the battery case 511.

A plurality of rectangular shaped batteries 510 having the above-described structure are stacked side-by-side in the thickness direction. The rectangular shaped batteries 510 are stacked with orientations of the rectangular shaped batteries 510 alternatively reversed so that the positive post 518a of one rectangular shaped battery 510 is adjacent the negative post 518b of the adjacent rectangular shaped battery 510. Accordingly, as shown in FIG. 5, the engaging pins 519a provided to the leg portion 515a of the battery case 511 of the rectangular shaped battery 510 are inserted into the engaging recesses 519b provided to the leg portion 515a of the battery case 511 of the adjacent rectangular shaped battery 510. Thus, movement of the pair of the rectangular shaped batteries 510 in a height direction can be suppressed.

When a plurality of the rectangular shaped batteries 510 are stacked side-by-side in the thickness direction, the positive post 518a of one rectangular shaped battery 510 is electrically and mechanically connected to the negative post 518b of the adjacent rectangular shaped battery 510 by a bus bar 561. The negative post 518b of this rectangular shaped battery 510 is electrically and mechanically connected to the positive post 518a of another rectangular shaped battery 510 located adjacent to this rectangular shaped battery 510 by another bus bar 561. Thus, all the stacked rectangular shaped batteries 510 are serially connected. The bus bars 561 are fixed by nuts 562 which are screwed to the positive posts 518a and the negative posts 518b electrically and mechanically connected to each other.

The rectangular shaped batteries 510 adjacent each other is connected with the engaging pin 519a of one of the rectangular shaped batteries 510 inserted into the engaging recesses 519b of the other rectangular shaped battery 510. Since the engaging recesses 519b have a slot shape extending along the width direction of the battery case 511, the engaging pins 519a inserted into the engaging recesses 519b can slide along the width direction of the battery case 511 inside the engaging recesses 519b. Therefore, when the positive post 518a and the negative post 518b of the rectangular shaped batteries 510 adjacent each other are connected by the bus bar 561, the rectangular shaped batteries 510 can be readily aligned.

Figure 8:
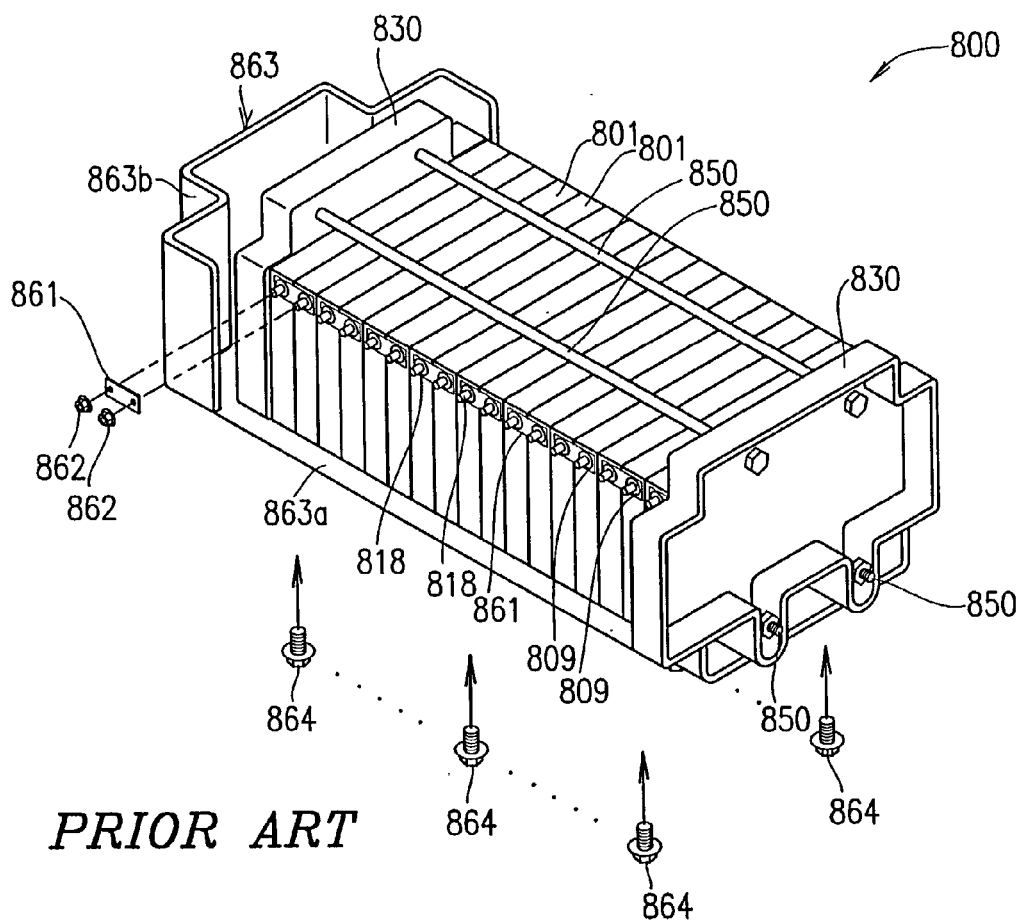
FIG. 8 is a perspective view of a conventional battery pack.

Similar to the battery pack 800 shown in FIG. 8, a plurality of the stacked rectangular shaped batteries 510 are fixed to a bottom surface 563a of a lower case 563 while being pressurized by a pair of pressurizing plates 530, with end portions 531, connected to each other by an upper pair and a lower pair of tie rods 550 with bolts 551 in recess 540. In the battery pack 500 of this example, every other rectangular shaped battery 510 is respectively fixed to the bottom surface 563a of the lower case 563 by a pair of bolts 564.

Figure 7:
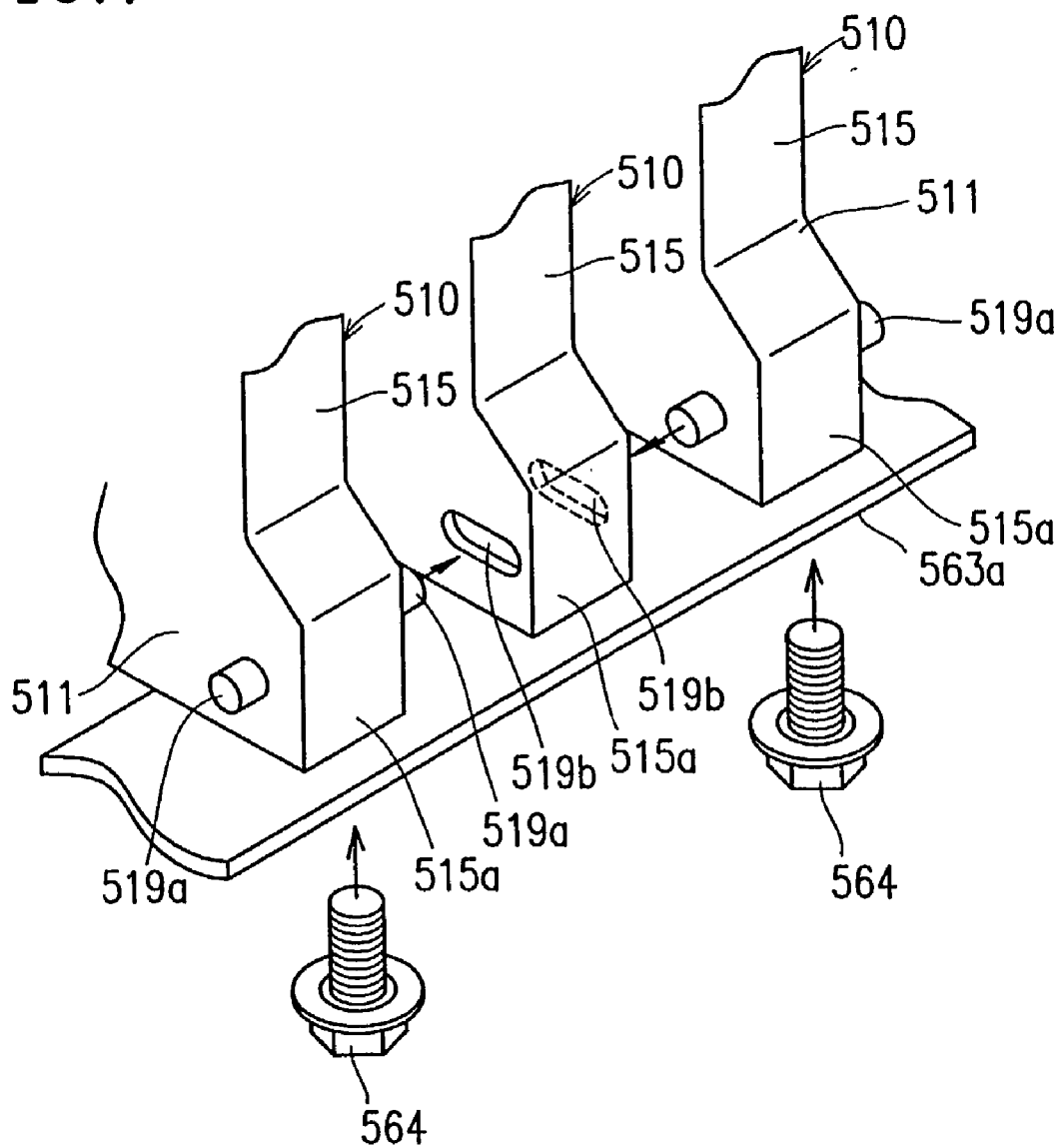
FIG. 7 is a perspective view of a portion of the battery pack shown in FIG. 5.

FIG. 7 is a perspective view of a portion of the battery pack 500. The rectangular shaped batteries 510 adjacent each other are engaged with the engaging pin 519a of one rectangular shaped battery 510 inserted into the engaging recesses 519b of the other rectangular shaped battery 510. Movement in the height direction is therefore suppressed. Therefore, even if a rectangular shaped battery 510 itself is not fixed to the bottom surface 563a of the lower case 563, it is fixed by the adjacent rectangular shaped batteries 510 which are fixed to the bottom surface 563a of the lower case 563 by the pair of the bolts 564.

As described above, since it is not necessary to bolt all the rectangular shaped batteries 510 to the bottom surface 563a of the lower case 563 for fixing a plurality of the rectangular shaped batteries 510 stacked side-by-side to the lower case 563, the efficiency of the assembly operation of the battery pack is significantly improved.

In this example, every other rectangular shaped battery 510 of the stacked rectangular shaped batteries 510 between the pressurizing plates 530 is fixed to the bottom surface 563a of the lower case 563 by the bolts 564. However, every two or more rectangular shaped batteries may be fixed by the bolts 564.

In the battery pack according to the present invention, since a plurality of rectangular shaped batteries stacked side-by-side in a thickness direction are pressurized by elastic members toward the thickness direction, even when the rectangular shaped batteries have shrunk, all the rectangular shaped batteries are maintained in the pressurized state. As a result, it is not necessary to screw all the rectangular shaped batteries to a case. Therefore, an assembly operation of the battery pack can be readily performed. Furthermore, expansion of the battery case of each of the rectangular shaped batteries is prevented.

By providing terminal plates which are held to each other by pressure in the rectangular shaped batteries to be pressurized, a special operation for electrically connecting the rectangular shaped batteries is not necessary. This also facilitates the assembly operation of the battery packs. Moreover, in the battery pack according to the present invention, since the rectangular shaped batteries adjacent each other are engaged and movement in a height direction is suppressed, it is not necessary to fix all the rectangular shaped batteries to the case. Accordingly, the assembly operation of the battery pack can be further facilitated.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A battery pack comprising:
   a plurality of rectangular shaped batteries, wherein each of the plurality of rectangular shaped batteries is formed into a thin rectangular-parallelepiped shape, and wherein the plurality of rectangular shaped batteries are stacked side-by-side in a thickness direction, and each battery includes a pin and a recess, the recess having a slot shape, said slot shape being longer in a width direction of the battery than in a height direction of the battery; and
   a pair of pressurizing plates, wherein one of the pressurizing plates is located at each end of the stacked rectangular shaped batteries oriented in the thickness direction and one of the plates is fitted with a compression spring which serves as an elastic member, wherein the pressurizing plates are elastically pushed against each other to pressurize the plurality of rectangular shaped batteries using the compression spring,
   wherein at least a pair of the rectangular shaped batteries stacked adjacent each other are stacked in a manner such that the pin of a first battery of the pair is inserted into the recess of a second battery of the pair so that movement in the height direction of the stacked rectangular shaped batteries, which is orthogonal to the thickness direction, is suppressed, and the pin of the first battery eon slide along the width direction inside the recess of the second battery,
   wherein a positive terminal plate and a negative terminal plate are provided on respective side surfaces of the rectangular shaped batteries along a width direction of the stacked rectangular shaped batteries, which is orthogonal to the thickness direction, the positive terminal plate being in contact with a negative terminal plate of one adjacent rectangular shaped battery and the negative terminal plate being in contact with a positive terminal plate of the other adjacent rectangular shaved battery.

2. A battery pack according to claim 1, wherein one of the pair of the pressurizing plates is connected to an end plate located beyond the other pressurizing plate with respect to the stacked rectangular shaped batteries, the other pressurizing plate proximate to the end plate being pushed away from the end plate by elastic members.

3. A battery pack according to claim 1, wherein the positive terminal plate and the negative terminal plate provided in each of the rectangular shaped batteries are pushed so that the positive terminal plate and the negative terminal plate are held to the negative terminal plate and the positive terminal plate of the adjacent rectangular shaped batteries by pressure.

4. A battery pack according to claim 3, wherein the terminal plates are formed of clad plates in which plates having a high elasticity and plates having a high conductivity are layered.

5. A battery pack according to claim 1, wherein every other or every few of the stacked rectangular shaped batteries of the rectangular shaped batteries stacked side-by-side in the thickness direction is or are fixed to a case.

* * * * *